(12) United States Patent
Zhang

(10) Patent No.: US 12,405,501 B2
(45) Date of Patent: Sep. 2, 2025

(54) LIQUID CRYSTAL DISPLAY PANEL AND MANUFACTURING METHOD THEREOF

(71) Applicant: GUANGZHOU CHINA STAR OPTOELECTRONICS SEMICONDUCTOR DISPLAY TECHNOLOGY CO., LTD., Guangdong (CN)

(72) Inventor: Ning Zhang, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/995,111

(22) PCT Filed: Aug. 30, 2022

(86) PCT No.: PCT/CN2022/115681
§ 371 (c)(1),
(2) Date: Sep. 29, 2022

(87) PCT Pub. No.: WO2024/040625
PCT Pub. Date: Feb. 29, 2024

(65) Prior Publication Data
US 2024/0255810 A1 Aug. 1, 2024

(30) Foreign Application Priority Data
Aug. 23, 2022 (CN) .......................... 202211017718.2

(51) Int. Cl.
*G02F 1/1343* (2006.01)
*G02F 1/1333* (2006.01)

(52) U.S. Cl.
CPC .. *G02F 1/134309* (2013.01); *G02F 1/133345* (2013.01)

(58) Field of Classification Search
CPC ......... G02F 1/133345; G02F 1/134372; G02F 1/134363; G02F 1/134309
See application file for complete search history.

(56) References Cited

U.S. PATENT DOCUMENTS

| 2011/0062432 A1 | 3/2011 | Yamazaki et al. |
| 2012/0081648 A1* | 4/2012 | Nagami ............ G02F 1/136213 349/139 |
| 2018/0239181 A1* | 8/2018 | Kimura ................. G02F 1/1343 |

FOREIGN PATENT DOCUMENTS

| CN | 102707523 A | 10/2012 |
| CN | 103064224 A | 4/2013 |

(Continued)

OTHER PUBLICATIONS

International Search Report in International application No. PCT/CN2022/115681, mailed on Jan. 18, 2023.

(Continued)

*Primary Examiner* — Mariam Qureshi
(74) *Attorney, Agent, or Firm* — PV IP PC; Wei Te Chung

(57) ABSTRACT

A liquid crystal display panel and a manufacturing method thereof are provided. By allowing a thickness of an insulating layer in an opening area to be less than a thickness of the insulating layer in a non-opening area, a storage capacitance between a first electrode layer and a second electrode layer in the opening area can be increased, a driving voltage of the liquid crystal display panel can be reduced, and power consumption can also be reduced. Meanwhile, since a parasitic capacitance is small, requirements of small parasitic (Continued)

capacitances and low power consumption of the liquid crystal display panel can be simultaneously achieved.

18 Claims, 4 Drawing Sheets

(56) References Cited

FOREIGN PATENT DOCUMENTS

| | | | |
|---|---|---|---|
| CN | 103293804 | A | 9/2013 |
| CN | 103915380 | A | 7/2014 |
| CN | 103943631 | A | 7/2014 |
| CN | 105511188 | A | 4/2016 |
| CN | 113394166 | A | 9/2021 |
| CN | 114171457 | A | 3/2022 |
| JP | 2010230744 | A | 10/2010 |

OTHER PUBLICATIONS

Written Opinion of the International Search Authority in International application No. PCT/CN2022/115681, mailed on Jan. 18, 2023.
Chinese Office Action issued in corresponding Chinese Patent Application No. 202211017718.2 dated Feb. 26, 2025, pp. 1-7.

* cited by examiner

LIQUID CRYSTAL DISPLAY PANEL AND MANUFACTURING METHOD THEREOF

FIELD OF INVENTION

The present disclosure relates to the field of display technologies, and more particularly, to a liquid crystal display panel and a manufacturing method thereof.

BACKGROUND OF INVENTION

In existing liquid crystal display devices, in order to improve viewing angles, brightness, contrast ratios, and response times, fringe field switching (FFS) technology is adopted. In liquid crystal display devices, in order to reduce parasitic capacitances, thicknesses of insulating layers will be increased, but this design will cause the liquid crystal display devices to have a smaller storage capacitance, and correspondingly, the liquid crystal display devices will require a higher driving voltage, thereby resulting in power consumption of the liquid crystal display devices being high.

Therefore, the existing liquid crystal display devices have a technical problem of being unable to simultaneously achieve requirements of small parasitic capacitances and low power consumption.

Technical problem: an embodiment of the present disclosure provides a liquid crystal display panel and a manufacturing method thereof to solve the technical problem of being unable to simultaneously achieve the requirements of small parasitic capacitances and low power consumption in the existing liquid crystal display devices.

SUMMARY OF INVENTION

In order to solve the above problem, the present disclosure provides following technical solutions.

An embodiment of the present disclosure provides a liquid crystal display panel, which includes:
  a base substrate;
  a first electrode layer disposed on one side of the base substrate;
  a second electrode layer disposed on one side of the first electrode layer away from the base substrate; and
  an insulating layer disposed between the first electrode layer and the second electrode layer;
  wherein, the liquid crystal display panel includes an opening area and a non-opening area, and a thickness of the insulating layer in the opening area is less than a thickness of the insulating layer in the non-opening area.

In some embodiments, the insulating layer includes a passivation layer disposed between the first electrode layer and the second electrode layer, and a thickness of the passivation layer in the opening area is less than a thickness of the passivation layer in the non-opening area.

In some embodiments, the liquid crystal display panel further includes a gate electrode layer, an active layer, and a source/drain electrode layer. Wherein, the gate electrode layer is disposed between the base substrate and the first electrode layer, the active layer is disposed on one side of the gate electrode layer away from the base substrate, the source/drain electrode layer is disposed on one side of the active layer away from the gate electrode layer, and the passivation layer is disposed between the source/drain electrode layer and the second electrode layer. A distance between the source/drain electrode layer and the second electrode layer is greater than a distance between the first electrode layer and the second electrode layer.

In some embodiments, the source/drain electrode layer includes a source electrode and a drain electrode, the source electrode is disposed on the first electrode layer, and the source electrode is overlapped with and connected to the first electrode layer.

In some embodiments, the source/drain electrode layer includes wirings, and in the non-opening area, the wirings overlap with the second electrode layer.

In some embodiments, the distance between the first electrode layer and the second electrode layer ranges from one sixth to one half of the distance between the source/drain electrode layer and the second electrode layer.

In some embodiments, the thickness of the insulating layer in the opening area ranges from one sixth to one half of the thickness of the insulating layer in the non-opening area.

In some embodiments, the thickness of the passivation layer in the non-opening area ranges from 4000 angstroms to 6000 angstroms.

In some embodiments, the thickness of the passivation layer in the opening area is less than 2000 angstroms.

In some embodiments, the insulating layer includes a gate insulating layer and a passivation layer, the gate insulating layer is disposed between the first electrode layer and the passivation layer, and the passivation layer is disposed between the gate insulating layer and the second electrode layer. A sum of thicknesses of the gate insulating layer and the passivation layer in the opening area is less than a sum of thicknesses of the gate insulating layer and the passivation layer in the non-opening area.

In some embodiments, the liquid crystal display panel further includes a gate electrode layer, an active layer, and a source/drain electrode layer, wherein the gate electrode layer is disposed between the base substrate and the gate insulating layer, the active layer is disposed between the gate insulating layer and the source/drain electrode layer, and the source/drain electrode layer is connected to the first electrode layer through a through-hole.

In some embodiments, the thickness of the gate insulating layer in the opening area is equal to the thickness of the gate insulating layer in the non-opening area, and the thickness of the passivation layer in the opening area is less than the thickness of the passivation layer in the non-opening area.

In some embodiments, the thickness of the gate insulating layer in the opening area is less than the thickness of the gate insulating layer in the non-opening area.

In some embodiments, the thickness of the passivation layer in the opening area is less than or equal to the thickness of the passivation layer in the non-opening area.

In some embodiments, the thickness of the passivation layer in the opening area is greater than the thickness of the passivation layer in the non-opening area, and the sum of the thicknesses of the gate insulating layer and the passivation layer in the opening area is less than the sum of the thicknesses of the gate insulating layer and the passivation layer in the non-opening area.

In some embodiments, the thickness of the gate insulating layer in the opening area is greater than the thickness of the gate insulating layer in the non-opening area, and the thickness of the passivation layer in the opening area is less than the thickness of the passivation layer in the non-opening area.

In some embodiments, the first electrode layer is a pixel electrode layer, and the second electrode layer is a common electrode layer.

In some embodiments, the opening area is a light-transmitting display area of the liquid crystal display panel, and the non-opening area includes a non-light-transmitting area between adjacent opening areas and a non-display area.

In some embodiments, the liquid crystal display panel further includes a liquid crystal layer, a color filter layer, and a substrate, wherein the liquid crystal layer is disposed on one side of the second electrode layer away from the first electrode layer, the color filter layer is disposed on one side of the liquid crystal layer away from the second electrode layer, and the substrate is disposed on one side of the color filter layer away from the liquid crystal layer.

Meanwhile, another embodiment of the present disclosure provides a manufacturing method of a liquid crystal display panel. The manufacturing method of the liquid crystal display panel includes following steps:

providing a base substrate;

disposing a first electrode layer on the base substrate;

depositing an insulating layer on the first electrode layer and disposing a photoresist layer on the insulating layer;

using a semi-transmissive mask to develop and etch the photoresist layer and obtaining a first photoresist part, a second photoresist part, and a non-photoresist part, wherein, the second photoresist part corresponds to an opening area, the first photoresist part corresponds to a non-opening area, a thickness of the non-photoresist part is zero, and a thickness of the second photoresist part is less than a thickness of the first photoresist part;

etching the insulating layer to form a through-hole, wherein, the through-hole corresponds to the non-photoresist part;

removing the second photoresist part;

etching an area of the insulating layer corresponding to the second photoresist part to allow a thickness of the insulating layer in the opening area corresponding to the second photoresist part to be less than a thickness of the insulating layer in the non-opening area corresponding to the first photoresist part; and removing the first photoresist part and disposing a second electrode layer on the insulating layer to obtain the liquid crystal display panel.

Beneficial effect: the present disclosure provides the liquid crystal display panel and the manufacturing method thereof. The liquid crystal display panel includes the base substrate, the first electrode layer, the second electrode layer, and the insulating layer. The first electrode layer is disposed on one side of the base substrate, the second electrode layer is disposed on one side of the first electrode layer away from the base substrate, and the insulating layer is disposed between the first electrode layer and the second electrode layer. Wherein, the liquid crystal display panel includes the opening area and the non-opening area, and the thickness of the insulating layer in the opening area is less than the thickness of the insulating layer in the non-opening area. In the present disclosure, by allowing the thickness of the insulating layer in the opening area to be less than the thickness of the insulating layer in the non-opening area, a storage capacitance between the first electrode layer and the second electrode layer in the opening area can be increased, and a driving voltage of the liquid crystal display panel can be reduced, thereby reducing power consumption. Meanwhile, since the thickness of the insulating layer in the non-opening area is greater than the thickness of the insulating layer in the opening area, a distance between electrodes or wirings in the non-opening area is larger, allowing a parasitic capacitance to be smaller, thereby being able to simultaneously achieve requirements of small parasitic capacitances and low power consumption of the liquid crystal display panel.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

Regarding a technical problem of being unable to simultaneously achieve requirements of small parasitic capacitances and low power consumption in existing liquid crystal display devices, an embodiment of the present disclosure provides a liquid crystal display panel and a manufacturing method thereof to solve the above technical problem.

In the embodiment of the present disclosure, a value of a storage capacitance between a first electrode layer and a second electrode layer is equal to a product of a dielectric constant of an insulating layer located between the first electrode layer and the second electrode layer, a vacuum dielectric constant, and a relative area of the first electrode layer and the second electrode layer dividing by a thickness of the insulating layer located between the first electrode layer and the second electrode layer. An amount of charges of the storage capacitance is equal to the value of the storage capacitance multiplied by a pixel driving voltage, so it can be understood that the pixel driving voltage is proportional to the thickness of the insulating layer between the first electrode layer and the second electrode layer. When the thickness of the insulating layer between the first electrode layer and the second electrode layer is greater, a required pixel driving voltage is larger, thereby causing power consumption of the liquid crystal display panel to be high. However, regarding parasitic capacitances, when the thickness of the insulating layer is greater, the parasitic capacitances are smaller. Therefore, the existing technology cannot take into account both parasitic capacitances and power consumption. In the embodiment of the present disclosure, by allowing a thickness of the insulating layer in an opening area to be less than a thickness of the insulating layer in a non-opening area, the storage capacitance in the opening area can be larger, and the pixel driving voltage can be reduced, thereby reducing the power consumption. At a same time, since the parasitic capacitances in the non-opening area are small, requirements of small parasitic capacitances and low power consumption can be simultaneously achieved.

Figure 1:
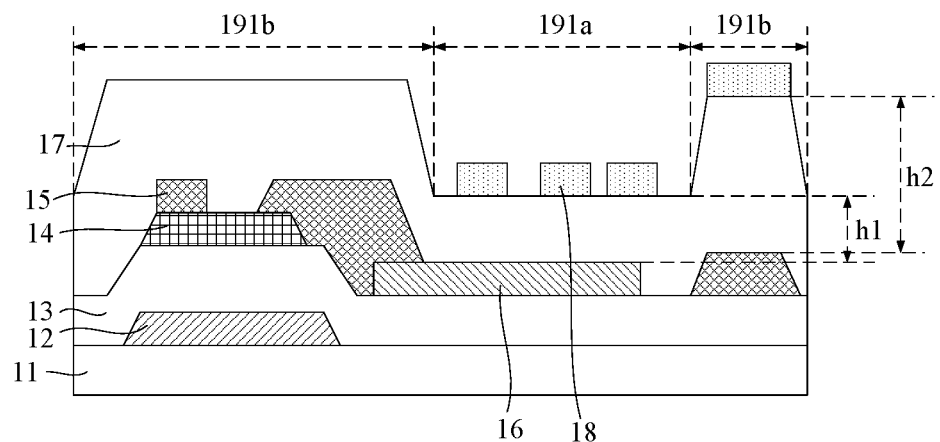
FIG. 1 is a first schematic diagram of a liquid crystal display panel according to an embodiment of the present disclosure.

As shown in FIG. 1, an embodiment of the present disclosure provides a liquid crystal display panel. The liquid crystal display panel 1 includes a base substrate 11, a first electrode layer 16, a second electrode layer 18, and an insulating layer (for example, a passivation layer 17 in FIG. 1). The first electrode layer 16 is disposed on one side of the base substrate 11, the second electrode layer 18 is disposed on one side of the first electrode layer 16 away from the base substrate 11, and the insulating layer is disposed between the first electrode layer 16 and the second electrode layer 18. Wherein, the liquid crystal display panel 1 includes an opening area 191a and a non-opening area 191b, and a thickness (for example, a thickness h1 of the passivation layer 17 in the opening area 191a of FIG. 1) of the insulating layer in the opening area 191a is less than a thickness (for example, a thickness h2 of the passivation layer 17 in the non-opening area 191b of FIG. 1) of the insulating layer in the non-opening area 191b.

As shown in FIG. 1, this embodiment of the present disclosure provides the liquid crystal display panel 1. In the liquid crystal display panel 1, by allowing the thickness of the insulating layer in the opening area 191a to be less than the thickness of the insulating layer in the non-opening area 191b, the storage capacitance between the first electrode layer 16 and the second electrode layer 18 in the opening area 191a can be increased, the driving voltage of the liquid crystal display panel 1 can be reduced, and the power consumption can also be reduced. Meanwhile, since the thickness of the insulating layer in the non-opening area 191b is greater than the thickness of the insulating layer in the opening area 191a, a distance between electrodes and wirings in the non-opening area 191b is larger, allowing a parasitic capacitance to be smaller, thereby being able to simultaneously achieve the requirements of small parasitic capacitances and low power consumption of the liquid crystal display panel.

In an embodiment, as shown in FIG. 1, the insulating layer includes the passivation layer 17 disposed between the first electrode layer 16 and the second electrode layer 18, and the thickness h1 of the passivation layer 17 in the opening area 191a is less than the thickness h2 of the passivation layer 17 in the non-opening area 191b. By allowing the thickness of the passivation layer in the opening area to be less than the thickness of the passivation layer in the non-opening area, the distance between the first electrode layer and the second electrode layer can be small, the storage capacitance can be larger, thereby reducing the pixel driving voltage of the liquid crystal display panel. At a same time, the thickness of the passivation layer in the non-opening area is larger, so the parasitic capacitances formed between the second electrode layer and other metals can be small, thereby simultaneously realizing the requirements of large storage capacitances and small parasitic capacitances of the liquid crystal display panel.

Specifically, from FIG. 1, it can be seen that in the opening area 191a, the thickness of the passivation layer between the first electrode layer 16 and the second electrode layer 18 is smaller, thereby allowing the storage capacitance formed between the first electrode layer 16 and the second electrode layer 18 to be larger. Correspondingly, the pixel driving voltage of the liquid crystal display panel can be smaller, and the power consumption of the liquid crystal display panel can be lower. Meanwhile, in the non-opening area 191b, the thickness of the passivation layer between the second electrode layer 18 and a source/drain electrode layer 15 is larger, allowing the parasitic capacitance between the second electrode layer 18 and the source/drain electrode layer 15 to be smaller, thereby being able to simultaneously achieve the requirements of small parasitic capacitances and low power consumption of the liquid crystal display panel.

Regarding the liquid crystal display panel being unable to simultaneously achieve the requirements of small parasitic capacitances and low power consumption, in an embodiment, as shown in FIG. 1, the liquid crystal display panel 1 further includes a gate electrode layer 12, an active layer 14, and the source/drain electrode layer 15. The gate electrode layer 12 is disposed between the base substrate 11 and the first electrode layer 16, the active layer 14 is disposed on one side of the gate electrode layer 12 away from the base substrate 11, the source/drain electrode layer 15 is disposed on one side of the active layer 14 away from the gate electrode layer 12, and the passivation layer 17 is disposed between the source/drain electrode layer 15 and the second electrode layer 18. A distance between the source/drain electrode layer 15 and the second electrode layer 18 (that is, the thickness h2 of the passivation layer 17 in the non-opening area 191b in FIG. 1) is greater than a distance between the first electrode layer 16 and the second electrode layer 18 (that is, the thickness h1 of the passivation layer 17 in the opening area 191a in FIG. 1). By allowing the distance between the source/drain electrode layer and the second electrode layer to be greater than the distance between the first electrode layer and the second electrode layer, the parasitic capacitance between the source/drain electrode layer and the second electrode layer can be smaller, and the storage capacitance between the first electrode layer and the second electrode layer can be larger, thereby being able to simultaneously achieve the requirements of small parasitic capacitances and low power consumption of the liquid crystal display panel.

Specifically, as shown in FIG. 1, the source/drain electrode layer 15 is formed with a source electrode and a drain electrode. The source electrode can be directly formed on the first electrode layer and be overlapped with the first electrode layer to realize electrical connection without forming a through-hole, which can reduce a thickness of the liquid crystal display panel and can reduce the manufacturing processes of the liquid crystal display panel. At a same time, the source/drain electrode layer 15 will also be formed with data lines and other wirings in the non-opening area, which may overlap with the second electrode layer, resulting in the parasitic capacitances. By allowing the distance between the source/drain electrode layer and the second electrode layer to be greater than the distance between the first electrode layer and the second electrode layer, the parasitic capacitances can be reduced.

Wherein, the first electrode layer may include a pixel electrode, which is directly connected to the source electrode. The second electrode layer may include a common electrode, and the common electrode is spaced apart from the pixel electrode to form an electric field for driving liquid crystals to rotate.

In an embodiment, the thickness of the insulating layer in the opening area ranges from one sixth to one half of the thickness of the insulating layer in the non-opening area.

Specifically, FIG. 1 is taken as an example. By making the thickness of the insulating layer in the opening area 191a (that is, the thickness h1 of the passivation layer 17 in FIG. 1) range from one sixth to one half of the thickness of the insulating layer in the non-opening area 191b (that is, the thickness h2 of the passivation layer 17 in FIG. 1), the thickness of the insulating layer in the opening area is smaller, thereby increasing the storage capacitance and reducing the power consumption. Besides, there will be no short circuits and signal interferences of signal lines caused by film layers being thin.

Specifically, when the insulating layer is the passivation layer, the thickness of the passivation layer in the non-opening area ranges from 4000 angstroms to 6000 angstroms, and the thickness of the passivation layer in the opening area is less than 2000 angstroms.

In an embodiment, as shown in FIG. 1, the distance h1 between the first electrode layer 16 and the second electrode layer 18 ranges from one sixth to one half of the distance h2 between the source/drain electrode layer 15 and the second electrode layer 18. By making the distance between the first electrode layer and the second electrode layer range from one sixth to one half of the distance between the source/drain electrode layer and the second electrode layer, the thickness of the insulating layer in the opening area can be smaller, the storage capacitance can be increased, the power consumption can be reduced, and the parasitic capacitance can be smaller. Besides, there will be no short circuits and signal interferences of signal lines caused by film layers being thin.

Figure 2:
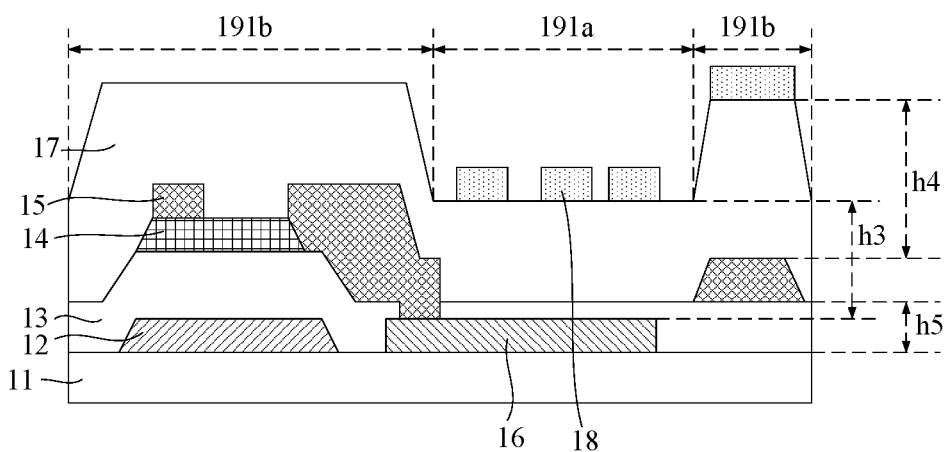
FIG. 2 is a second schematic diagram of the liquid crystal display panel according to an embodiment of the present disclosure.

Regarding the technical problem of being unable to simultaneously achieve the requirements of small parasitic capacitances and low power consumption in existing liquid crystal display devices, in an embodiment, as shown in FIG. 2, the insulating layer includes a gate insulating layer 13 and the passivation layer 17. The gate insulating layer 13 is disposed between the first electrode layer 16 and the passivation layer 17, and the passivation layer 17 is disposed between the gate insulating layer 13 and the second electrode layer 18. A sum h3 of thicknesses of the gate insulating layer 13 and the passivation layer 17 in the opening area 191a is less than a sum (h4+h5) of thicknesses of the gate insulating layer 13 and the passivation layer 17 in the non-opening area 191b. By making the sum of the thicknesses of the gate insulating layer and the passivation layer in the opening area be less than the sum of the thicknesses of the gate insulating layer and the passivation layer in the non-opening area, the thickness of at least one of the gate insulating layer and the passivation layer in the opening area can be reduced, thereby increasing the storage capacitance between the first electrode layer and the second electrode layer, reducing the pixel driving voltage, and reducing the power consumption. Meanwhile, the thicknesses of the gate insulating layer and the passivation layer in the non-opening area are greater, so the parasitic capacitance is reduced, thereby being able to simultaneously achieve the requirements of small parasitic capacitances and low power consumption of the liquid crystal display panel.

Specifically, as shown in FIG. 2, the liquid crystal display panel 1 further includes the gate electrode layer 12, the active layer 14, and the source/drain electrode layer 15. Wherein, the gate electrode layer 12 is disposed between the base substrate 11 and the gate insulating layer 13, the active layer 14 is disposed between the gate insulating layer 13 and the source/drain electrode layer 15, and the source/drain electrode layer 15 is connected to the first electrode layer 16 through a through-hole. When the first electrode layer is disposed between the base substrate and the gate insulating layer, the source/drain electrode layer may be connected to the first electrode layer by the through-hole, thereby realizing signal transmission.

Figure 3:
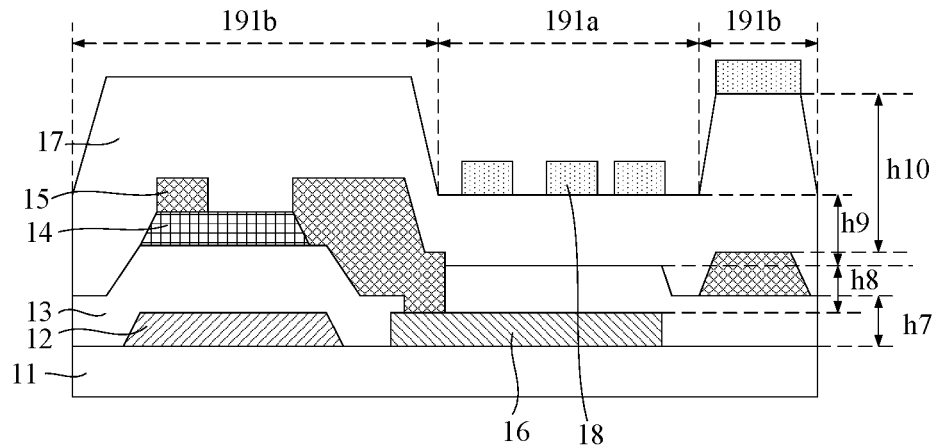
FIG. 3 is a third schematic diagram of the liquid crystal display panel according to an embodiment of the present disclosure.

Regarding the parasitic capacitance formed between the second electrode layer and the source/drain electrode layer of the liquid crystal display panel, in an embodiment, as shown in FIG. 3, a thickness h8 of the gate insulating layer 13 in the opening area 191a is equal to a thickness h7 of the gate insulating layer 13 in the non-opening area 191b, and a thickness h9 of the passivation layer 17 in the opening area 191a is less than a thickness h10 of the passivation layer 17 in the non-opening area 191b. By allowing the thickness of the gate insulating layer 13 in the opening area 191a to be equal to the thickness of the gate insulating layer 13 in the non-opening area, when manufacturing the liquid crystal display panel, a manufacturing process of the gate insulating layer does not need to be changed. At a same time, since the thickness of the passivation layer 17 in the opening area 191a is less than the thickness of the passivation layer 17 in the non-opening area 191b, the thickness of the insulating layer between the first electrode layer 16 and the second electrode layer 18 can be reduced, thereby increasing the storage capacitance between the first electrode layer 16 and the second electrode layer 18, reducing the pixel driving voltage of the liquid crystal display panel, and reducing the power consumption. Meanwhile, since the thickness of the insulating layer between the second electrode layer 18 and the source/drain electrode layer 15 in the non-opening area 191b is larger, the parasitic capacitance is reduced, thereby being able to simultaneously achieve the requirements of small parasitic capacitances and low power consumption of the liquid crystal display panel.

Specifically, for liquid crystal display panels, parasitic capacitances will exist between electrodes of different film layers, but since the parasitic capacitances between metal layers separated by multiple film layers are small, generally, the parasitic capacitances between the metal layers separated by multiple film layers are not considered. However, the parasitic capacitances between adjacent metal layers are larger, so reducing the parasitic capacitances between adjacent metal layers can reduce a voltage drop of the liquid crystal display panels. In this embodiment of the present disclosure, by making the thickness of the insulating layer between the second electrode layer and the source/drain electrode layer be greater than the thickness of the insulating layer in the opening area, the parasitic capacitances can be reduced. The parasitic capacitance that may exist between the second electrode layer and the gate electrode layer is not described herein because the parasitic capacitance is small. Further, since the insulating layer between the second electrode layer and the source/drain electrode layer is also between the second electrode layer and the gate electrode layer, even if there is a parasitic capacitance existing between the second electrode layer and the gate electrode layer, the parasitic capacitance between the second electrode layer and the gate electrode layer can also be reduced.

In an embodiment, as shown in FIG. 2, the thickness of the gate insulating layer 13 in the opening area 191a is less than the thickness of the gate insulating layer 13 in the non-opening area 191b. By allowing the thickness of the gate insulating layer 13 in the opening area 191a to be less than the thickness of the gate insulating layer 13 in the non-opening area 191b, the storage capacitance between the first electrode layer 16 and the second electrode layer 18 in the opening area can be increased, and the pixel driving voltage of the liquid crystal display panel can be reduced, thereby reducing the power consumption of the liquid crystal display panel. At a same time, since the thickness of the gate insulating layer in the non-opening area is larger, when projections of the source/drain electrode layer and the gate electrode layer overlap, the parasitic capacitance between the source/drain electrode layer and the gate electrode layer can be reduced, and the voltage drop of the liquid crystal display panel can be reduced, thereby being able to simultaneously achieve the requirements of small parasitic capacitances and low power consumption of the liquid crystal display panel.

In an embodiment, as shown in FIG. 3, the thickness h9 of the passivation layer 17 in the opening area 191a is less than or equal to the thickness h10 of the passivation layer 17 in the non-opening area 191b. By allowing the thickness of the passivation layer 17 in the opening area 191a to be equal to the thickness of the passivation layer 17 in the non-opening area 191b, when manufacturing the liquid crystal display panel, a manufacturing process of the passivation layer does not need to be changed. In addition, the sum of the thicknesses of the gate insulating layer and the passivation layer in the opening area is less than the sum of the thicknesses of the gate insulating layer and the passivation layer in the non-opening area, so the storage capacitance between the first electrode layer and the second electrode layer can be increased, the pixel driving voltage can be reduced, and the power consumption can be reduced. Meanwhile, the thicknesses of the gate insulating layer and the passivation layer in the non-opening area are greater, so the parasitic capacitance is reduced, thereby being able to simultaneously achieve the requirements of small parasitic capacitances and low power consumption of the liquid crystal display panel. By allowing the thickness of the passivation layer in the opening area to be less than the thickness of the passivation layer in the non-opening area, the distance between the first electrode layer and the second electrode layer can be small, the storage capacitance therebetween can be larger, and the pixel driving voltage of the liquid crystal display panel can be reduced, thereby reducing the power consumption of the liquid crystal display panel. At the same time, the thickness of the passivation layer in the non-opening area is larger, so the parasitic capacitances formed between the second electrode layer and other metals can be small, thereby simultaneously realizing the requirements of large storage capacitances and small parasitic capacitances of the liquid crystal display panel.

Specifically, by allowing the thickness of the gate insulating layer in the opening area to be less than the thickness of the gate insulating layer in the non-opening area and allowing the thickness of the passivation layer in the opening area to be less than the thickness of the passivation layer in the non-opening area, the storage capacitance between the first electrode layer and the second electrode layer in the opening area can be further increased, and the pixel driving voltage of the liquid crystal display panel can be further reduced, thereby reducing the power consumption of the liquid crystal display panel. Meanwhile, since the thicknesses of the gate insulating layer and the passivation layer in the non-opening area are larger, the parasitic capacitance between the second electrode layer and the source/drain electrode layer can be smaller, the parasitic capacitance between the source/drain electrode layer and the gate electrode layer can be smaller, and the parasitic capacitance between the second electrode layer and the gate electrode layer can be smaller, thereby reducing the parasitic capacitances of the liquid crystal display panel and reducing the voltage drop, thereby simultaneously realizing the requirements of large storage capacitances and small parasitic capacitances of the liquid crystal display panel.

Specifically, the thickness of the passivation layer in the opening area may also be greater than the thickness of the passivation layer in the non-opening area, and at the same time, the sum of the thicknesses of the gate insulating layer and the passivation layer in the opening area is less than the sum of the thicknesses of the gate insulating layer and the passivation layer in the non-opening area. Therefore, the storage capacitance between the first electrode layer and the second electrode layer can be increased, and the pixel driving voltage of the liquid crystal display panel can be reduced, thereby reducing the power consumption of the liquid crystal display panel. Meanwhile, the thickness of the passivation layer in the non-opening area is larger, so the parasitic capacitances formed between the second electrode layer and other metals can be small, thereby simultaneously realizing the requirements of large storage capacitances and small parasitic capacitances of the liquid crystal display panel.

In an embodiment, the thickness of the gate insulating layer in the opening area is greater than the thickness of the gate insulating layer in the non-opening area, and the thickness of the passivation layer in the opening area is less than the thickness of the passivation layer in the non-opening area. By allowing the thickness of the gate insulating layer in the opening area to be greater than the thickness of the gate insulating layer in the non-opening area, allowing the thickness of the passivation layer in the opening area to be less than the thickness of the passivation layer in the non-opening area, and allowing the distance between the second electrode layer and the source/drain electrode layer in the non-opening area to be increased, the parasitic capacitance between the second electrode layer and the source/drain electrode layer can be reduced. Meanwhile, by allowing the sum of the thicknesses of the gate insulating layer and the passivation layer in the opening area to be less than the sum of the thicknesses of the gate insulating layer and the passivation layer in the non-opening area, the storage capacitance between the first electrode layer and the second electrode layer can be increased, the pixel driving voltage can be reduced, and the power consumption can be reduced. Meanwhile, since the distance between the second electrode layer and the source/drain electrode layer in the non-opening area is larger, the parasitic capacitance is reduced, thereby being able to simultaneously achieve the requirements of small parasitic capacitances and low power consumption of the liquid crystal display panel.

In an embodiment, the first electrode layer is a pixel electrode layer, and the second electrode layer is a common electrode layer. The display effect can be improved by patterning the common electrode layer to form multiple domains.

In this embodiment, the opening area refers to a light-transmitting display area of the liquid crystal display panel, and the non-opening area may include a non-light-transmitting area between adjacent opening areas and may also include a non-display area.

In an embodiment, the liquid crystal display panel further includes a liquid crystal layer, a color filter layer, and a substrate. Wherein, the liquid crystal layer is disposed on one side of the second electrode layer away from the first electrode layer, the color filter layer is disposed on one side of the liquid crystal layer away from the second electrode layer, and the substrate is disposed on one side of the color filter layer away from the liquid crystal layer.

Figure 4:
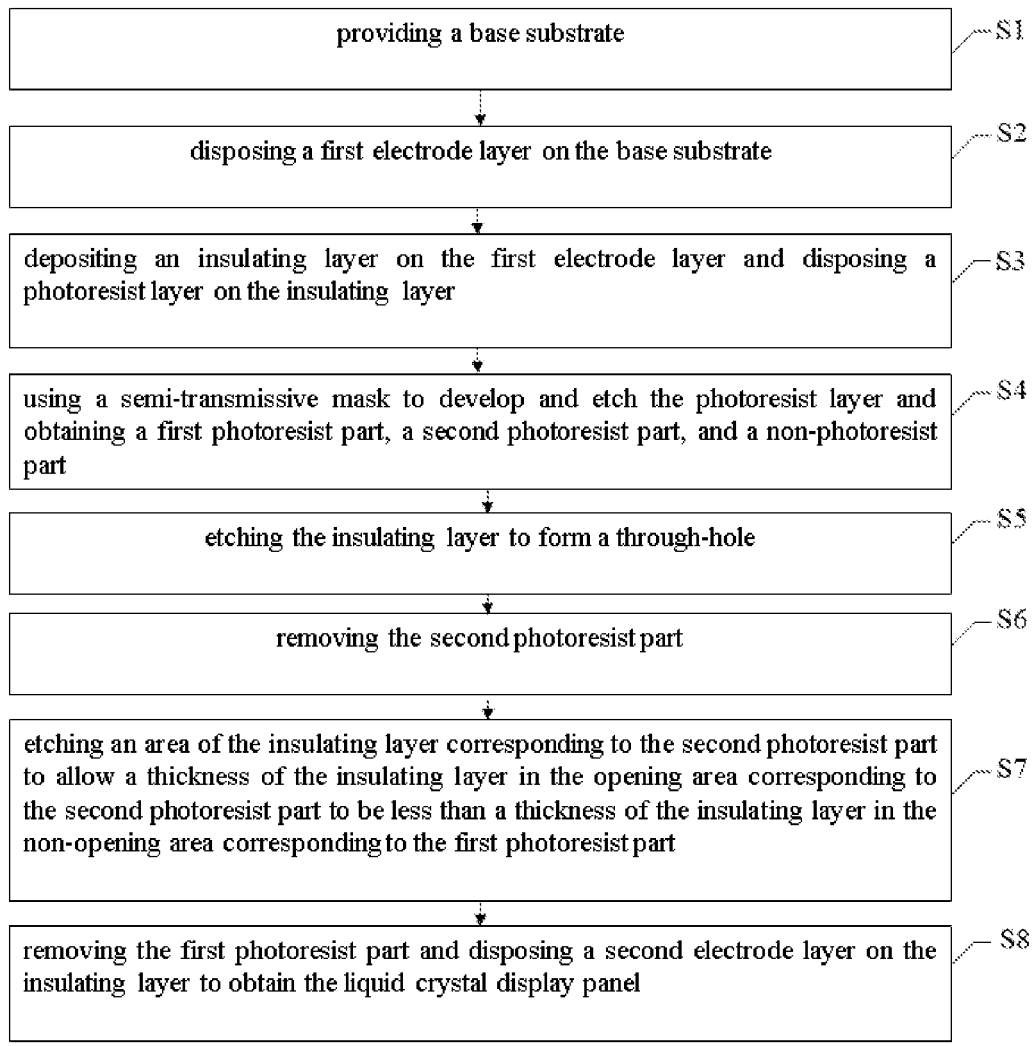
FIG. 4 is a flowchart of a manufacturing method of the liquid crystal display panel according to an embodiment of the present disclosure.

Meanwhile, as shown in FIG. 4, an embodiment of the present disclosure provides a manufacturing method of the liquid crystal display panel. The manufacturing method of the liquid crystal display panel includes following steps.

Figure 5:
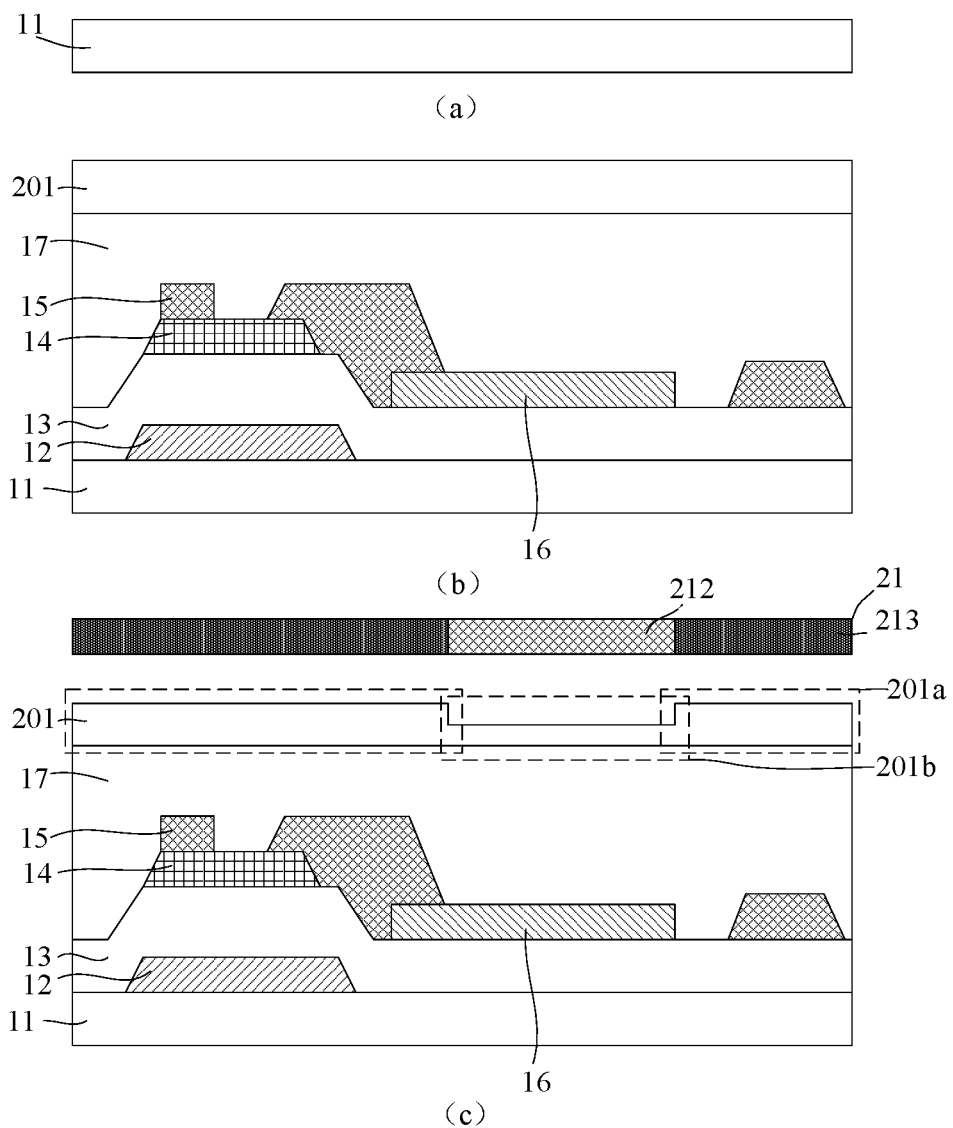
FIG. 5 is a first schematic diagram of the liquid crystal display panel corresponding to each step in the manufacturing method of the liquid crystal display panel according to an embodiment of the present disclosure.

Step S1: providing the base substrate. A structure of the liquid crystal display panel corresponding to this step is shown in FIG. 5(a).

Step S2: disposing the first electrode layer on the base substrate. A structure of the liquid crystal display panel corresponding to this step is shown in FIG. 5(b).

Step S3: depositing the insulating layer on the first electrode layer and disposing a photoresist layer on the insulating layer. The structure of the liquid crystal display panel corresponding to this step is shown in FIG. 5(b).

Step S4: using a semi-transmissive mask to develop and etch the photoresist layer and obtaining a first photoresist part, a second photoresist part, and a non-photoresist part, wherein the second photoresist part corresponds to the opening area, the first photoresist part corresponds to the non-opening area, a thickness of the non-photoresist part is zero, and a thickness of the second photoresist part is less than a thickness of the first photoresist part. A structure of the liquid crystal display panel corresponding to this step is shown in FIG. 5(c).

Figure 7:
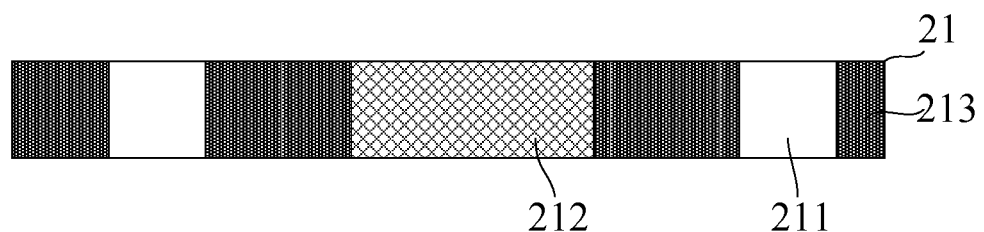
FIG. 7 is a schematic diagram of a semi-transmissive mask according to an embodiment of the present disclosure.

Specifically, as shown in FIG. 7, the semi-transmissive mask 21 includes a fully light-transmittance part 211, a semi-light-transmittance part 212, and a non-light-transmittance part 213. A transmittance of the fully light-transmittance part 211 may be 100%, a transmittance of the non-light-transmittance part 213 may be 0, and a transmittance of the semi-light-transmittance part 212 may be between the transmittances of the non-light-transmittance part and the fully light-transmittance part. The insulating layer can be etched correspondingly by etching the photoresist layer by the semi-transmissive mask, so the insulating layer may be formed with the through-hole and a plurality of parts having different thicknesses. Specifically, the thickness of the insulating layer in the opening area is less than the thickness of the insulating layer in the non-opening area. Therefore, the storage capacitance between the first electrode layer and the second electrode layer can be increased, and the pixel driving voltage can be reduced, thereby reducing the power consumption. Meanwhile, since the distance between the second electrode layer and the source/drain electrode layer in the non-opening area is larger, the parasitic capacitance is reduced, thereby being able to simultaneously achieve the requirements of small parasitic capacitances and low power consumption of the liquid crystal display panel.

Specifically, when using the semi-transmissive mask to develop and etch the photoresist layer, as shown in FIG. 5(c), the semi-light-transmittance part 212 and the non-light-transmittance part 213 of the semi-transmissive mask 21 are shown in the figure, and the first photoresist part 201a, the second photoresist part 201b, and the non-photoresist part (not shown in the figure) are obtained by developing and etching the photoresist layer 201 by the semi-transmissive mask 21, thereby making the thickness of the second photoresist part 201b be less than the thickness of the first photoresist part 201a.

Step S5: etching the insulating layer to form the through-hole, wherein, the through-hole corresponds to the non-photoresist part.

Step S6: removing the second photoresist part. A structure of the liquid crystal display panel corresponding to this step is shown in FIG. 6(a).

Step S7: etching an area of the insulating layer corresponding to the second photoresist part to allow a thickness of the insulating layer in the opening area corresponding to the second photoresist part to be less than a thickness of the insulating layer in the non-opening area corresponding to the first photoresist part. A structure of the liquid crystal display panel corresponding to this step is shown in FIG. 6(b).

Figure 6:
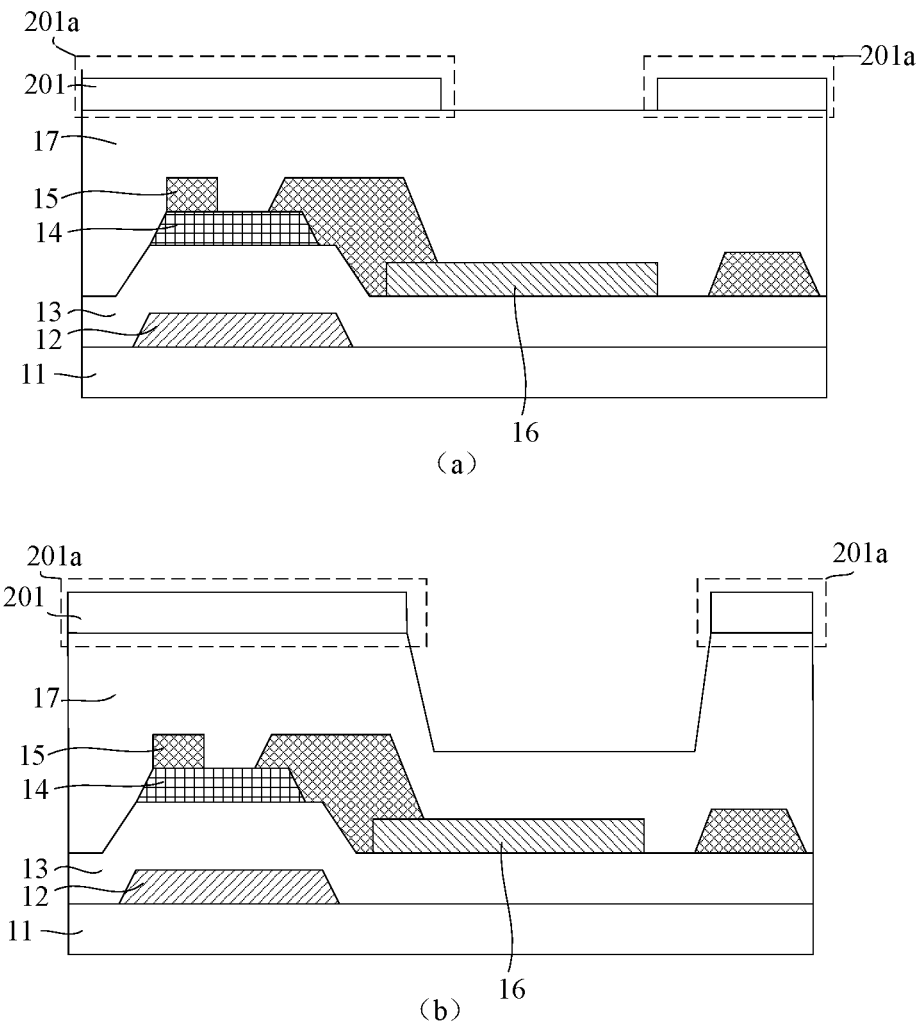
FIG. 6 is a second schematic diagram of the liquid crystal display panel corresponding to each step in the manufacturing method of the liquid crystal display panel according to an embodiment of the present disclosure.

Specifically, as shown in FIG. 6(b), since the insulating layer in the non-opening area is protected by the first photoresist part 201a, only the insulating layer in the opening area can be etched, thereby allowing the thickness of the insulating layer in the opening area to be less than the thickness of the insulating layer in the non-opening area.

Step S8: removing the first photoresist part and disposing the second electrode layer on the insulating layer to obtain the liquid crystal display panel. A structure of the liquid crystal display panel corresponding to this step is shown in FIG. 1.

This embodiment of the present disclosure provides the manufacturing method of the liquid crystal display panel. In the liquid crystal display panel manufactured by the manufacturing method of the liquid crystal display panel, by allowing the thickness of the insulating layer in the opening area to be less than the thickness of the insulating layer in the non-opening area, the storage capacitance between the first electrode layer and the second electrode layer in the opening area can be increased, and the driving voltage of the liquid crystal display panel can be reduced, thereby reducing the power consumption. Meanwhile, since the thickness of the insulating layer in the non-opening area is greater than the thickness of the insulating layer in the opening area, the distance between electrodes or wirings in the non-opening area is larger, allowing the parasitic capacitance to be smaller, thereby being able to simultaneously achieve the requirements of small parasitic capacitances and low power consumption of the liquid crystal display panel.

Further, an embodiment of the present disclosure provides a liquid crystal display device, which includes the liquid crystal display panel in any one of the above embodiments.

Specifically, the liquid crystal display device usually includes a backlight, a frame, and the liquid crystal display panel. The frame connects the backlight to the liquid crystal display panel, and the backlight is used to provide backlight for the liquid crystal display panel.

Specifically, the backlight includes a direct type backlight module or an edge type backlight module.

It can be known according to the above embodiments:

The embodiments of the present disclosure provide the liquid crystal display panel and the manufacturing method thereof. The liquid crystal display panel includes the base substrate, the first electrode layer, the second electrode layer, and the insulating layer. The first electrode layer is disposed on one side of the base substrate, the second electrode layer is disposed on one side of the first electrode layer away from the base substrate, and the insulating layer is disposed between the first electrode layer and the second electrode layer. Wherein, the liquid crystal display panel includes the opening area and the non-opening area, and the thickness of the insulating layer in the opening area is less than the thickness of the insulating layer in the non-opening area. In the present disclosure, by allowing the thickness of the insulating layer in the opening area to be less than the thickness of the insulating layer in the non-opening area, the storage capacitance between the first electrode layer and the second electrode layer in the opening area can be increased, and the driving voltage of the liquid crystal display panel can be reduced, thereby reducing the power consumption. Meanwhile, since the thickness of the insulating layer in the non-opening area is greater than the thickness of the insulating layer in the opening area, the distance between electrodes or wirings in the non-opening area is larger, allowing the parasitic capacitance to be smaller, thereby being able to simultaneously achieve the requirements of small parasitic capacitances and low power consumption of the liquid crystal display panel.

In the above embodiments, the description of each embodiment has its own emphasis. For the parts that are not described in detail in an embodiment, can refer to the detailed description of other embodiments above.

The liquid crystal display panel and the manufacturing method thereof provided by the embodiments of the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A liquid crystal display panel, comprising:
   a base substrate;
   a first electrode layer disposed on one side of the base substrate;
   a second electrode layer disposed on one side of the first electrode layer away from the base substrate;
   an insulating layer disposed between the first electrode layer and the second electrode layer; and
   a source/drain electrode layer disposed on one side of the insulating layer away from the second electrode layer, the source/drain electrode layer comprises wirings;
   wherein the liquid crystal display panel comprises an opening area and a non-opening area, in the non-opening area, the wirings overlap with the second electrode layer, the opening area is a light-transmitting display area of the liquid crystal display panel, the non-opening area comprises a non-light-transmitting area between adjacent opening areas and a non-display area, and a thickness of the insulating layer located between the first electrode layer and the second electrode layer in the opening area is less than a thickness of the insulating layer located between the wirings and the second electrode layer in the non-opening area.

2. The liquid crystal display panel according to claim 1, wherein the insulating layer comprises a passivation layer disposed between the first electrode layer and the second electrode layer, the passivation layer is in contact with the second electrode layer and the wirings in the non-opening area, and a thickness of the passivation layer in the opening area is less than a thickness of the passivation layer in the non-opening area.

3. The liquid crystal display panel according to claim 2, further comprising a gate electrode layer and an active layer, wherein the gate electrode layer is disposed between the base substrate and the first electrode layer, the active layer is disposed on one side of the gate electrode layer away from the base substrate, the source/drain electrode layer is disposed on one side of the active layer away from the gate electrode layer, and the passivation layer is disposed between the source/drain electrode layer and the second electrode layer; and a distance between the source/drain electrode layer and the second electrode layer is greater than a distance between the first electrode layer and the second electrode layer.

4. The liquid crystal display panel according to claim 3, wherein the source/drain electrode layer and the first electrode layer are disposed in a same layer, the source/drain electrode layer comprises a source electrode and a drain electrode, the source electrode is located in the non-opening area and disposed on the first electrode layer, and the source electrode is overlapped with and connected to the first electrode layer.

5. The liquid crystal display panel according to claim 3, wherein the distance between the first electrode layer and the second electrode layer ranges from one sixth to one half of the distance between the source/drain electrode layer and the second electrode layer.

6. The liquid crystal display panel according to claim 2, wherein the thickness of the insulating layer in the opening area ranges from one sixth to one half of the thickness of the insulating layer in the non-opening area.

7. The liquid crystal display panel according to claim 6, wherein the thickness of the passivation layer in the non-opening area ranges from 4000 angstroms to 6000 angstroms.

8. The liquid crystal display panel according to claim 6, wherein the thickness of the passivation layer in the opening area is less than 2000 angstroms.

9. The liquid crystal display panel according to claim 1, wherein the insulating layer comprises a gate insulating layer and a passivation layer, the gate insulating layer is disposed between the first electrode layer and the passivation layer, the passivation layer is disposed between the gate insulating layer and the second electrode layer, and the passivation layer is in contact with the second electrode layer and the wirings in the non-opening area; and a sum of thicknesses of the gate insulating layer and the passivation layer in the opening area is less than a sum of thicknesses of the gate insulating layer and the passivation layer in the non-opening area.

10. The liquid crystal display panel according to claim 9, further comprising a gate electrode layer and an active layer, wherein the gate electrode layer is disposed between the base substrate and the gate insulating layer, the active layer is disposed between the gate insulating layer and the source/drain electrode layer, the source/drain electrode layer is located between the first electrode layer and the second electrode layer, and the source/drain electrode layer is connected to the first electrode layer through a through-hole.

11. The liquid crystal display panel according to claim 9, wherein the thickness of the gate insulating layer in the opening area is equal to the thickness of the gate insulating layer in the non-opening area, and the thickness of the passivation layer in the opening area is less than the thickness of the passivation layer in the non-opening area.

12. The liquid crystal display panel according to claim 9, wherein the thickness of the gate insulating layer in the opening area is less than the thickness of the gate insulating layer in the non-opening area.

13. The liquid crystal display panel according to claim 12, wherein the thickness of the passivation layer in the opening area is less than or equal to the thickness of the passivation layer in the non-opening area.

14. The liquid crystal display panel according to claim 9, wherein the thickness of the passivation layer in the opening area is greater than the thickness of the passivation layer in the non-opening area, and the sum of the thicknesses of the gate insulating layer and the passivation layer in the opening area is less than the sum of the thicknesses of the gate insulating layer and the passivation layer in the non-opening area.

15. The liquid crystal display panel according to claim 9, wherein the thickness of the gate insulating layer in the opening area is greater than the thickness of the gate insulating layer in the non-opening area, and the thickness of the passivation layer in the opening area is less than the thickness of the passivation layer in the non-opening area.

16. The liquid crystal display panel according to claim 1, wherein the first electrode layer is a pixel electrode layer, and the second electrode layer is a common electrode layer.

17. The liquid crystal display panel according to claim 1, further comprising a liquid crystal layer, a color filter layer, and a substrate, wherein the liquid crystal layer is disposed on one side of the second electrode layer away from the first electrode layer, the color filter layer is disposed on one side of the liquid crystal layer away from the second electrode layer, and the substrate is disposed on one side of the color filter layer away from the liquid crystal layer.

18. A manufacturing method of a liquid crystal display panel, comprising following steps:

providing a base substrate;

disposing a first electrode layer on the base substrate;

disposing a source/drain electrode layer, and the source/drain electrode layer comprising wirings;

depositing an insulating layer on the first electrode layer and the source/drain electrode layer;

disposing a photoresist layer on the insulating layer;

using a semi-transmissive mask to develop and etch the photoresist layer and obtaining a first photoresist part, a second photoresist part, and a non-photoresist part, wherein the second photoresist part corresponds to an opening area, the opening area being a light-transmitting display area of the liquid crystal display panel, the first photoresist part corresponds to a non-opening area, the non-opening area comprising a non-light-transmitting area between adjacent opening areas and a non-display area, a thickness of the non-photoresist part is zero, and a thickness of the second photoresist part is less than a thickness of the first photoresist part;

etching the insulating layer to form a through-hole, wherein the through-hole corresponds to the non-photoresist part;

removing the second photoresist part;

etching an area of the insulating layer corresponding to the second photoresist part to allow a thickness of the insulating layer in the opening area corresponding to the second photoresist part to be less than a thickness of the insulating layer in the non-opening area corresponding to the first photoresist part; and removing the first photoresist part and disposing a second electrode layer on the insulating layer to obtain the liquid crystal display panel, such that in the non-opening area, the wirings overlap with the second electrode layer, and a thickness of the insulating layer located between the first electrode layer and the second electrode layer in the opening area is less than a thickness of the insulating layer located between the wirings and the second electrode layer in the non-opening area.

* * * * *